United States Patent [19]
Smith

[11] 3,979,750
[45] Sept. 7, 1976

[54] OPTICAL PUMP POWER DISTRIBUTION FEED

[75] Inventor: Bob L. Smith, Huntsville, Ala.

[73] Assignee: The United States of America as represented by the Secretary of the Army, Washington, D.C.

[22] Filed: June 20, 1975

[21] Appl. No.: 588,917

[52] U.S. Cl.............................. 343/100 SA; 343/754; 343/854
[51] Int. Cl.² ........................................... H04B 7/00
[58] Field of Search ............... 343/754, 854, 100 SA

[56] References Cited
UNITED STATES PATENTS

| | | |
|---|---|---|
| 3,500,410 | 3/1970 | Erhardt et al................ 343/100 SA |
| 3,678,387 | 7/1972 | Wilson........................ 343/100 SA |
| 3,835,469 | 9/1974 | Chen et al. ........................ 343/754 |
| 3,878,520 | 4/1975 | Wright et al....................... 343/854 |

Primary Examiner—David C. Nelms
Attorney, Agent, or Firm—Lawrence A. Neureither; Jack W. Voigt; Robert C. Sims

[57] ABSTRACT

An array of parametric amplifiers is optically fed pump power by a pump source. Beam steering of the array is provided by changing the apparent phase of the pump source.

4 Claims, 4 Drawing Figures

OPTICAL PUMP POWER DISTRIBUTION FEED

DEDICATORY CLAUSE

The invention described herein may be manufactured, used, and licensed by or for the Government for Governmental purposes without the payment to me of any royalties thereon.

BACKGROUND OF THE INVENTION

A major problem in using modular phased arrays having a parametric amplifier at each element is providing pump power to the parametric amplifiers. This difficulty is caused by the fact that the pump frequency must be much higher than the operating frequency, ten or more times higher. If the operating frequency itself is high, for example, 10 gHz, then the pump frequency is inconveniently high. It becomes difficult to distribute over a large array face because of conventional feed losses and the phase tolerances (and thus mechanical tolerances) that may be required.

SUMMARY OF THE INVENTION

A receiver array is comprised of parametric amplifiers which are optically fed for simultaneous distribution of the pump power and for beam steering of the antenna array. The output phase of a degenerative parametric amplifier is directly proportional to the phases of the input and the pump signals and independent of frequency. Since wavelengths are inversely related to the frequencies, small changes in the high frequency pump input path conveys large changes in the output phase of the antenna array. Therefore the pump power source can be moved physically or a steering means can cause steering of the receiver array.

DESCRIPTION OF THE PREFERRED EMBODIMENTS

Figure 1:
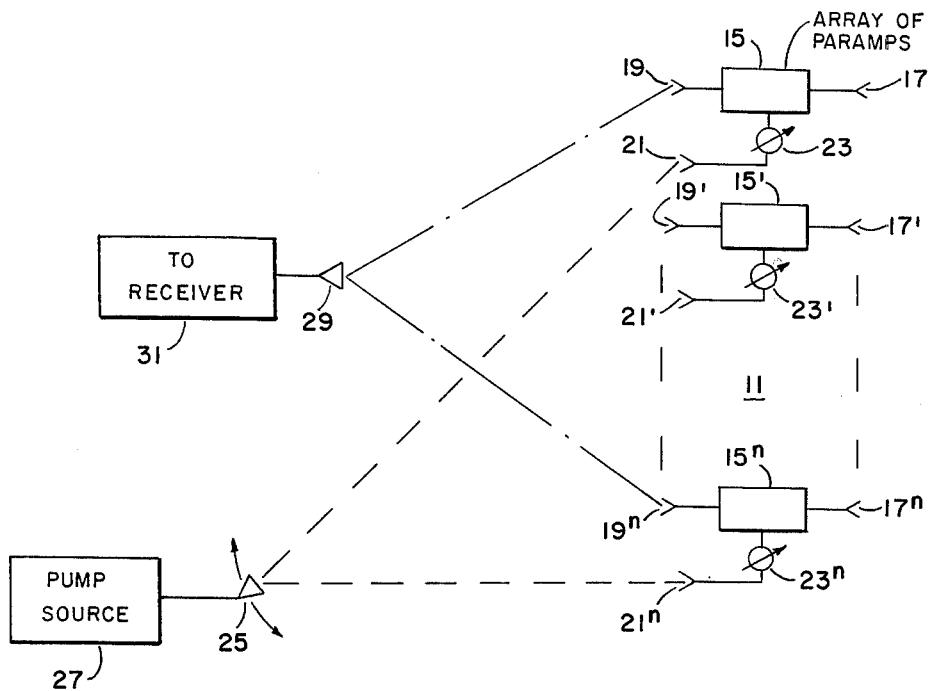
FIG. 1 is a side view of one embodiment of the present invention.
Figure 2:
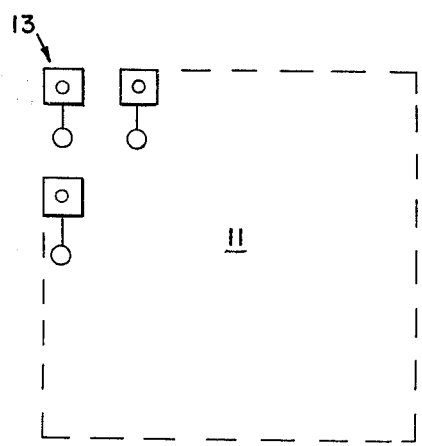
FIG. 2 is a front view of the receiver array.

The receiver array 11 is shown in FIGS. 1–4 and consists of a lattice of units 13 as shown in FIG. 2. FIG. 1 shows that each unit consists of a degenerative parametric amplifier 15, a signal receiver antenna element 17, a signal output antenna element 19, pump horn collector element 21, and a phase shifter 23. The phase shifter 23 is used in the conventional way to correct for line length differences.

A pump radiator horn 25 is provided to optically feed the pump receiver horns 21–21n of the parametric amplifiers. A pump source 27 provides power for the pump horn. The pump horn 25 is movable as indicated by the arrows so as to provide steering to the antenna array 11. Advantage is taken of the fact that the output phase of the degenerative parametric amplifier is dependent directly on the phase of both the signal phase and the pump power phase. The phase is conserved independently of frequency. In other words, for a fixed input phase, if the pump position is varied ten degrees, the output phase of the antenna also changes ten degrees. Since the pump frequency is ten or more times that of the input signal frequency to the antennas, a small path length change at the pump 25 will accomplish a large change in the output phase of the array of antenna elements 19–19n.

Figure 3:
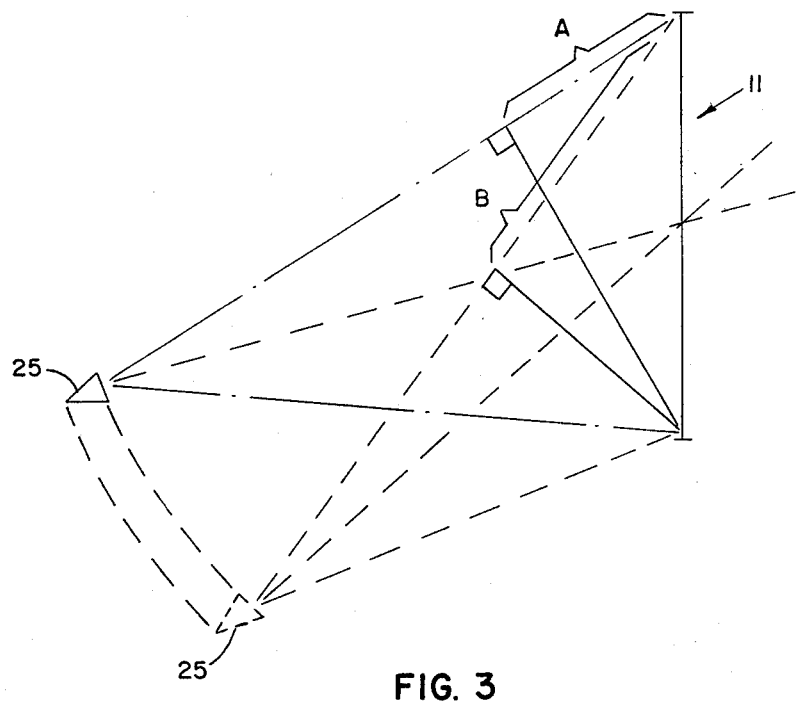
FIG. 3 is an illustration of the change in the phase of the pump power with movement of the pump horn.

FIG. 3 shows how a small change in pump feed horn position and angle results in a large change in array steering angle. The path length change between A and B caused by the motion of horn 25 while still centered on the center of array face 11 is made clear. Obviously since the path lengths are changed the phase of the signal arriving at the different pump receiver horns is changed proportionally. With the use of the steering by pump horn 25, the signal picked up by antenna elements 17–17n can be steered to the signal collector horn 29 which is connected to the receiver 31.

Figure 4:
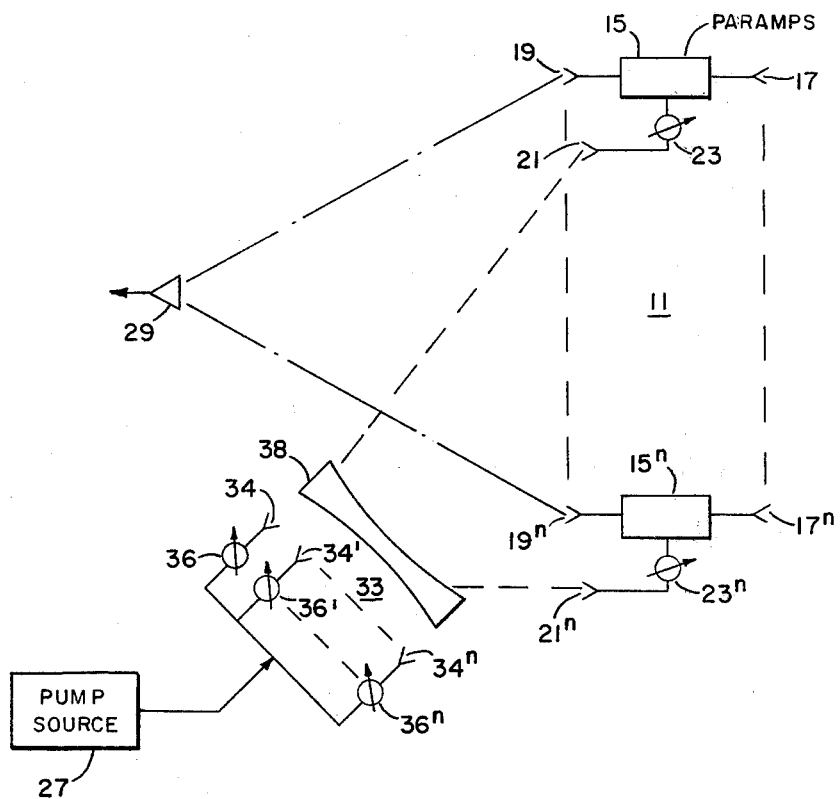
FIG. 4 illustrates an alternative embodiment with electronic steerable pump power.

FIG. 4 is the same as FIG. 1 except that the pump horn is made up of an array 33 of horns 34–34n. The array is electronically controlled by phase shifters 36–36n which are supplied by controlling means within the radar not shown. A defocussing lens 38 is provided for distributing the power to the pump receiver horns 21. The defocussing lens 38 may be omitted by proper setting of the biases in the phase shifters. The embodiment shown in FIG. 4 accomplishes the same as that shown in FIG. 1 except that instead of physically moving the pump horn; the apparent position of the feed is controlled by the phase shifters electronically. This presents a phase shift to the parametric amplifiers 15–15n so as to steer the signal received by the array 11.

I claim:

1. A system comprising a plurality of receiver antenna elements in an array; a plurality of parametric amplifiers each having an input terminal, output terminal and a pump feed terminal; a source of pump power being connected to said pump feed terminals; said plurality of receiver array antenna elements being connected to said input terminals; said source of pump power having its phase input to the pump feed terminals changeable so as to cause steering of the output of the parametric amplifiers; a plurality of pump feed horns having their outputs connected to the pump feed terminals; a pump horn connected to said source of pump power; and said pump horn spatially feeding said plurality of feed horns.

2. The system as set forth in claim 1 wherein said pump horn is movable relative to the antenna elements so as to provide the steering.

3. A system as set forth in claim 1 wherein said pump horn comprises an array of pump radiator horns connected to said source of pump power; and said array of pump radiator horns spacially feeding said pump feed horns so as to provide pump power for the parametric amplifiers.

4. A system as set forth in claim 3 further comprising means connected between the pump power and said pump radiator horns so as to electronically change the phase output of the pump radiator horns in order to provide steering of the output of said amplifiers.

* * * * *